United States Patent [19]

F'Geppert

[11] 3,826,151

[45] July 30, 1974

[54] POWER TRAIN
[75] Inventor: Erwin F'Geppert, Novi, Mich.
[73] Assignee: The United States of America as represented by the Secretary of the Army, Washington, D.C.
[22] Filed: Feb. 27, 1973
[21] Appl. No.: 336,293

[52] U.S. Cl. .................................................. 74/400
[51] Int. Cl. ............................................ F16h 35/08
[58] Field of Search ....................................... 74/400

[56] References Cited
UNITED STATES PATENTS
2,788,674   4/1957   Dennys ............................... 74/400

Primary Examiner—Leonard H. Gerin
Attorney, Agent, or Firm—Edward J. Kelly; Herbert Berl; John F. Schmidt

[57] ABSTRACT

Bevel gears are adjustable as to prevailing torque, tooth load, and backlash. A bearing pod supporting a gear shaft is externally threaded and the gear case is internally threaded. An annular driver between the pod and the case carries internal and external threads of different pitches but the same hand. Rotation of the annulus while pod and case are held stationary provides micro-adjustability of the associated gear away from or toward the other gear to achieve the desired mesh as to backlash, tooth contact pattern, and prevailing torque.

10 Claims, 8 Drawing Figures

NO LOAD

QUARTER LOAD

HALF LOAD

THREE-QUARTER LOAD

FULL LOAD

POWER TRAIN

The invention described herein may be manufactured, used, and licensed by or for the Government for governmental purposes without payment to me of any royalty thereon.

BACKGROUND OF THE INVENTION

1. Field of the Invention

The invention relates to bevel gear sets and means to mount one or both meshing bevel gears in a way to provide for easy adjustment of a gear along its axis to provide optimum running characteristics in terms of backlash, contact patterns, and torque.

The term "prevailing torque" is used in referring to the torque specified on the assembly drawing, and is conventionally set forth as a stated maximum and a stated minimum to turn the input shaft under no-load conditions. This requires a precise location of bearings, so as to establish a desired "preload" as an aid in preventing bearing looseness.

"Backlash" refers to play in the mesh of the gears which allows one gear to oscillate relative to the other. As a practical matter, backlash is a function of the pitch and the quality of the gearing. Large teeth and coarse applications, as one might find in farm machinery for example, are likely to have more backlash than one would expect to find in watches, household appliances, and the like. Even at the lowest surviving temperature, the teeth should mesh without interfering.

The tooth "contact pattern" is virtually self-evident and refers to the visible contact area with which a tooth on one gear engages a tooth on the gear in mesh with it. The contact pattern is a function of the load, and the assembly drawing often shows the desired contact pattern for various loads. Preferably, the drawing will show the preferred contact patterns for the driving side of the teeth and for the coasting side.

2. Description of the Prior Art

In theory, it should be possible to achieve nearly ideal conditions of gear performance. In actual practise, however, any close approach to the desired ideal is so expensive as to be unattainable on a competitive basis. In fact, the extremely high cost of a precision design may well be why conventional practise relies heavily on the use of shims to adjust gears to arrive at a reasonable compromise in backlash and contact patterns while transmitting the required torque.

Shims, obviously, have a finite thickness which limits the "fineness" of gear adjustment by shimming. The thinner the shim, the more likely it is to wrinkle, be squeezed out, and leak in a stack of shims; moreover, extremely thin shims are a safety hazard in terms of cuts in the hands of mechanics, which cuts are almost invariably in a dirty environment and thus invite infection. Also, shims are likely to trap dirt between the engaging faces.

The very nature of shim fitting, being "cut and try," requires repetitive assembly and disassembly of the shim stack. Present-day unrealistically high wages combined with a lack of patience and lack of pride of workmanship make such practises virtually prohibitive.

One prior art attempt to avoid the drawbacks of shimming includes the use of ball bearing lock nuts. However, that expedient also entails large increments of change (from one slot to the next), and does not solve the vibration problem because the nut is merely held against turning, and the nut vibrates with its tab-locking washer.

SUMMARY OF THE INVENTION

Preferably, both bevel gears are mounted so as to be shiftable along their axes of rotation, i.e., can be adjusted toward or away from each other, although some of the advantages of the invention can be realized in a bevel gear train in which only one of the gears is thus adjustable. A threaded bearing pod engages a thread on a driver which carries a second thread adapted to engage a threaded opening in a suitable support such as a gear case or a frame element. The two threads on the driver have slightly different pitches so that turning of the driver while the pod and the support are held against turning effects axial movement of the pod. If the two threads on the driver are the same hand, the pod will move axially a very small distance, which distance moreover is infinitely variable — i.e., the device has micro-adjustability. In a preferred form, the driver is an annulus having internal and external threads.

DESCRIPTION OF EMBODIMENT OF FIGS. 1 AND 2

Figure 1:
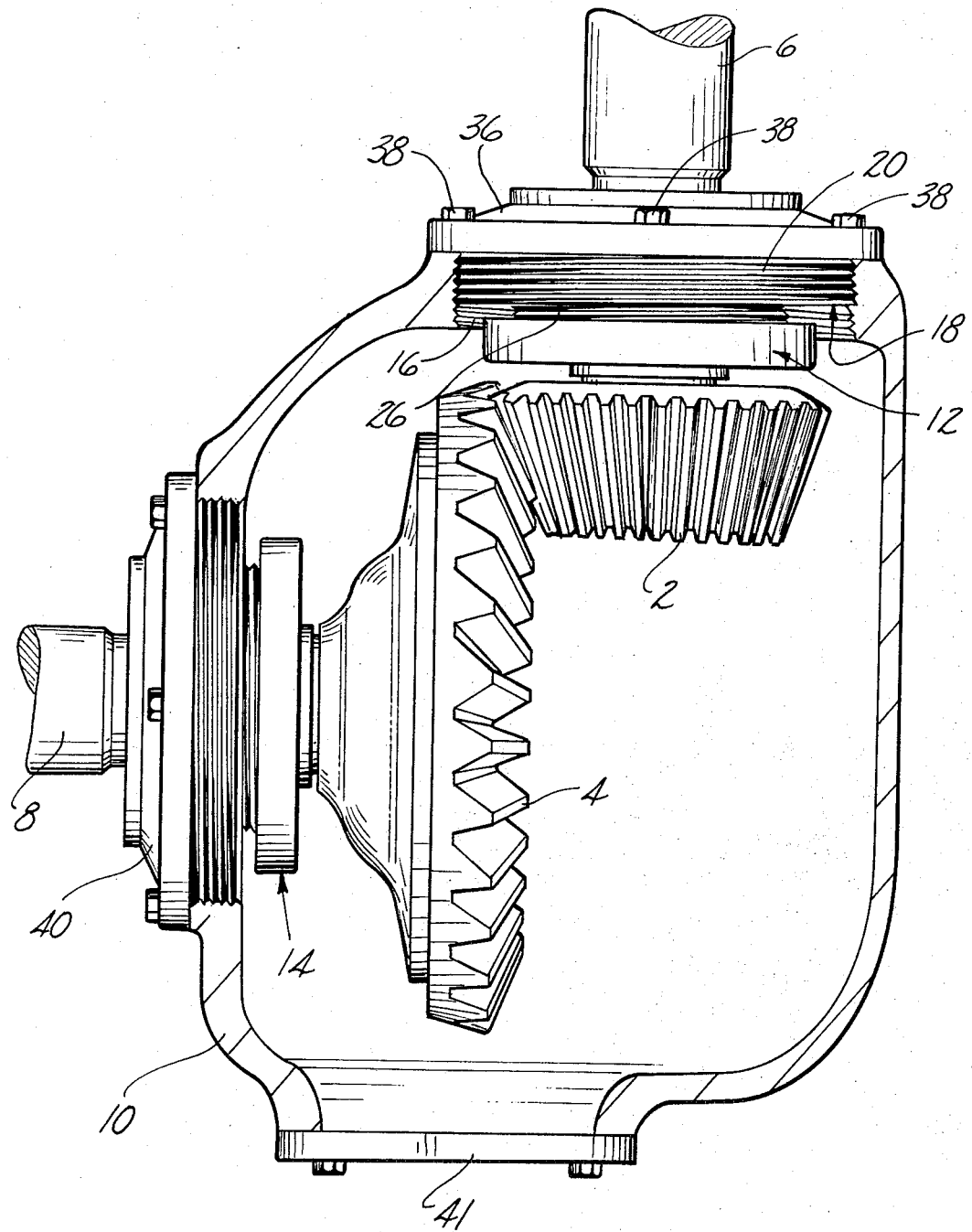
FIG. 1 is a section through a bevel gear set which shows two meshing bevel gears, each of which is axially adjustable.

A bevel gear set is shown in this embodiment ad comprising a pinion 2 meshing with a larger bevel gear 4, mounted on and for rotation with shafts 6 and 8 respectively. Any conventional suitable support may be provided, such as the gear case 10. Shaft 6 is rotatable in a bearing pod 12 and shaft 8 is rotatable in a bearing pod 14.

Figure 2:
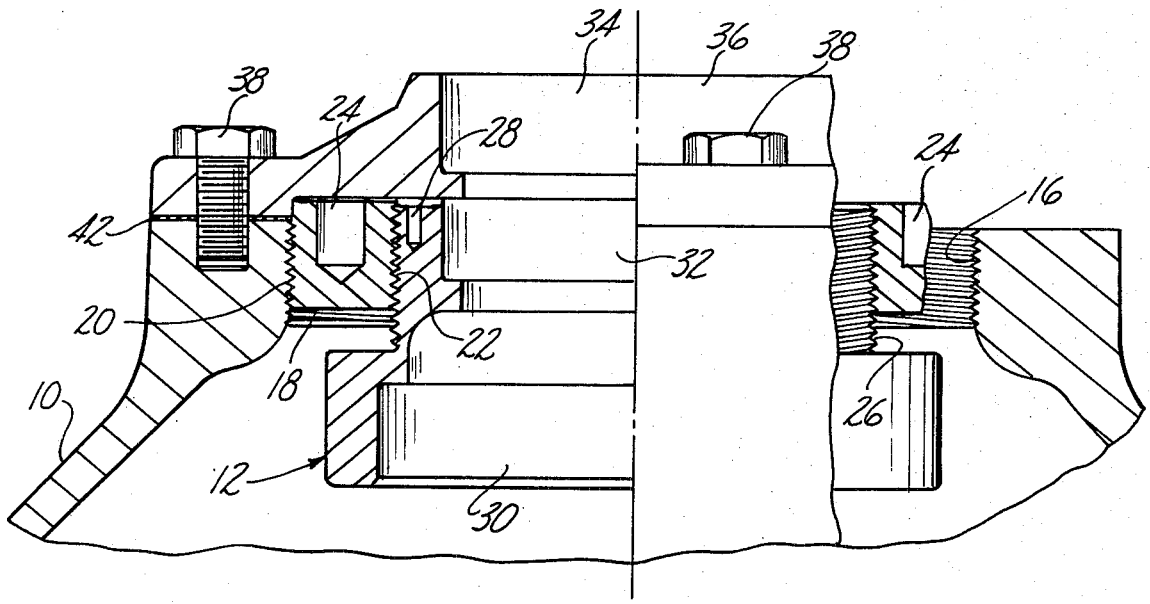
FIG. 2 is an enlarged view, with parts broken away and in section but without the gear and its shaft, showing the bearing pod for the bevel pinion of the gear set of FIG. 1.
Figure 3:
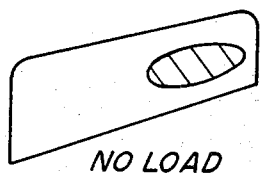
FIGS. 3–7 show typical tooth contact patterns for, respectively, no-load, quarter-load, half-load, three-quarter-load, and full-load conditions.
Figure 4:
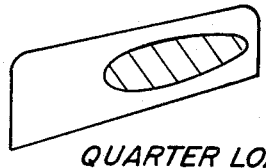
Figure 5:
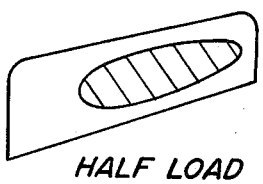
Figure 6:
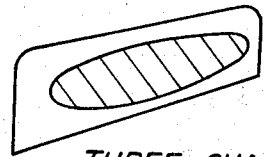
Figure 7:
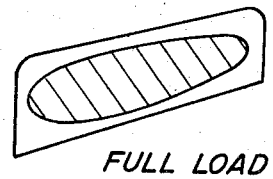

Bearing pod 12 is shown in more detail in FIG. 2. As can be seen there, the support (gear case 10) is provided with a threaded opening 16. A driver, which in this embodiment is an annulus 18, carries an external thread 20 and an internal thread 22. Thread 20 cooperates with threaded opening 16 and has, therefore, the same pitch as the thread of opening 16. Annulus 18 is provided with means for engagement by a wrench, such as the two holes 24 shown in FIG. 2.

The two threads 20 and 22 on annulus 18 are of a slightly different pitch. For micro adjustability, the threads are of the same hand, and the difference between the two pitches is preferably no greater than unity. Internal thread 22 is adapted to cooperate with a like external thread 26 on bearing pod 12. Pod 12 is provided with one or more openings such as that shown at 28 to receive a suitable pin (not shown) to be used by a mechanic in holding pod 12 against rotation while he slowly turns the driver (annulus 18) to make the fine adjustment necessary to achieve the desired balance between tooth contact and backlash.

The bearing pod 12 may be designed for such bearings as the situation requires, and these form no part of the invention. The illustrated structure shows a tapered roller bearing 30 at the inner end or face of pod 12 and a second such bearing 32 at the outer end or face of pod 12. An oil seal 34 is shown as held in place on shaft 6 by a cover 36, which in turn is secured to case 10 by cap screws 38.

Similarly, a cover 40 (FIG. 1) forms part of the assembly pertaining to shaft 8 and pod 14. So that gear 4 may be placed into case 10, a cover 41 is provided to close a suitably shaped opening. Conventional gaskets such as that shown at 42, FIG. 2, will be provided.

The annulus 18 may if desired be provided with suitable thread lock devices for both the internal and the external threads. Such devices are well known in the art and need not be disclosed here.

THE EMBODIMENT SHOWN IN FIG. 8

Figure 8:
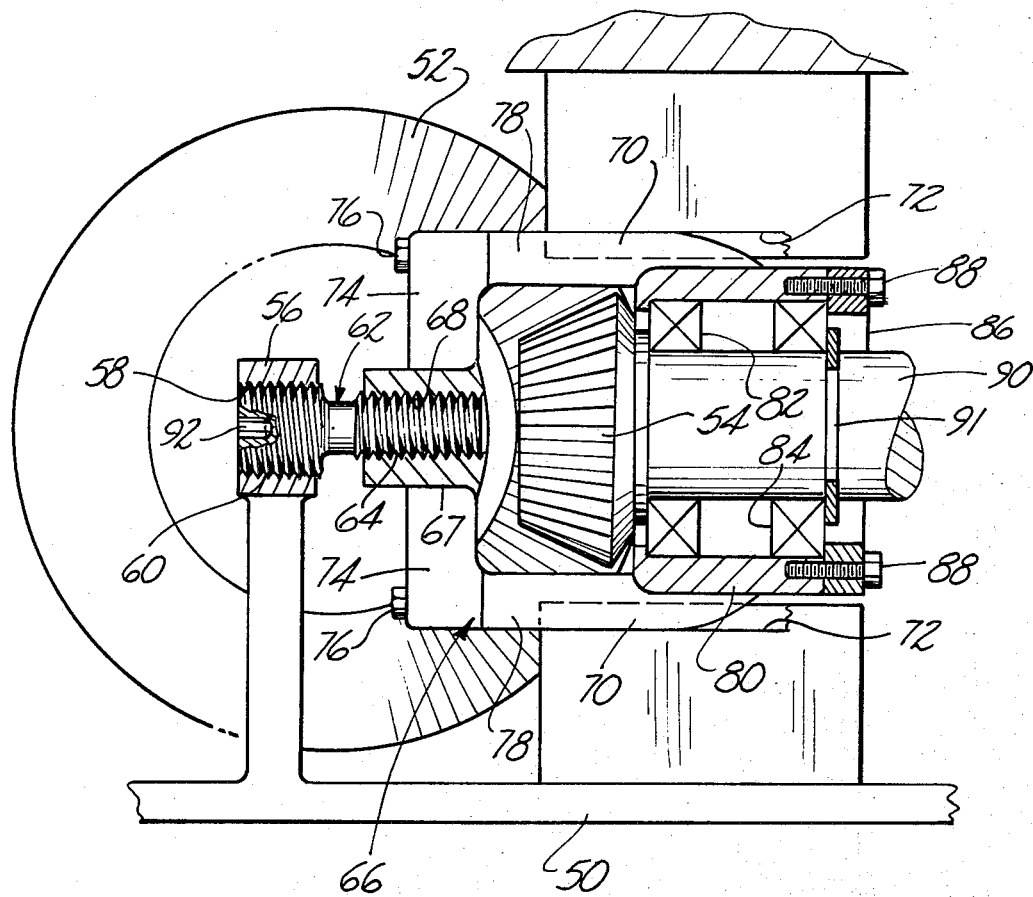
FIG. 8 shows another embodiment of the invention.

In FIG. 8, structure is disclosed which realizes some of the advantages of the preferred embodiment disclosed in FIGS. 1 and 2. In this less advantageous embodiment, a support 50 is shown for meshing bevel gears 52 and 54. In this embodiment, it is assumed that gear 52 is rotatably supported by any suitable conventional prior art means not detailed here, but that gear 54 is carried in support 50 by an embodiment of this invention.

A projection 56 is shown as carried by support 50 and provided with an internal thread 58 to receive and cooperate with a similar external thread 60 on an elongated, generally cylindrical driver 62. Longitudinally spaced from thread 60 along the axis of rotation of driver 62, a second external thread 64 is provided on driver 62; the outside diameter of thread 64 is preferably less than the inside diameter of thread 58.

A bearing pod 66, in the shape of a closed loop, is provided with a hub 67 having an internal thread 68 which is adapted to receive and cooperate with thread 64. The two threads 60 and 64 on driver 62 are of the same hand and of slightly different pitches, and in this they correspond to the threads 20 and 22 of driver (annulus) 18 of FIG. 2.

Bearing pod 66 suitably supports gear 54 for rotation on and relative to pod 66, which is itself held against rotation relative to support 50 by keys 70 riding in grooves 72, keys 70 being carried on opposed portions of the closed loop forming pod 66, and grooves 72 being provided by support 50. Pod 66, as a part of said closed loop, comprises a spider having a plurality of fingers 74 secured to and extending radially outward from hub 67, and at their outer ends secured by threaded members 76 to arms 78 of a yoke carrying a bearing ring 80 in which are mounted tapered roller bearings 82 and 84, the pod here shown as terminating in a flange 86 (preferably split), secured to ring 80 by threaded members 88. Ring 80 is a portion of the closed loop which, in this embodiment, is opposite hub 67, and the axis of rotation provided by the bearings is coaxial with the axis of thread 68.

Bearings 82 and 84 support a shaft 90 on which gear 54 is mounted. A snap ring 91 may if desired be provided in a suitable groove in shaft 90, tightly disposed against bearing 84. As will be apparent to those skilled in the art, keys 70 are here shown as formed integral with arms 78. The embodiment here shows two arms 78, but it will be understood that the structure will be provided with as many such fingers 74 and arms 78 cooperating with grooves 72 as may be needed to provide the rigidity needed to mount gear 54.

Driver 62 is provided at its left end with a recess 92 of a suitable size and shape to receive a tool usable by an operator to turn the driver to shift gear 54 along its axis of rotation. Not shown are means to lock driver 62 against accidental turning, which may be conventional.

OPERATION

Turning again to FIG. 2, persons skilled in the art will know that the adjustments are made with cover 36 removed, as the mechanic turns the shaft by hand or by hand-controlled means. If the assembly incorporates thread lock means, such means will first be released if necessary. The mechanic puts a holding pin in the hole 28 of the bearing pod, and engages openings 24 with the projections of a suitable spanner wrench, not shown.

The pitches of the two threads of annulus 18 (the driver) differ by a small amount. If one thread has a pitch of 20 turns per inch and the other a pitch of 21 turns per inch, pod 12 will move axially 0.002386 inch (approximately) for one complete turn of driver 18. As will be understood by those skilled in the art, a smaller difference between pitches will result in a smaller axial movement per turn of the driver.

The mechanic thus adjusts the mesh of the gears until the desired balance of back-lash, tooth contact pattern, and prevailing torque is accomplished, whereupon the threads are again locked against accidental relative movement.

The operation of the FIG. 8 embodiment will be understood from the foregoing. It is noted here that the FIG. 8 embodiment lends itself more readily to axial adjustment of gear 54 during actual operation of the gear train. I wish it to be understood that I do not desire to be limited to the exact details of construction shown and described for obvious modificaitons will occur to a person skilled in the art.

It is claimed:

1. A power train having two meshing bevel gears rotatably mounted in a suitable support, wherein the mounting means for at least one gear comprises:
    a. a portion of the support having a threaded opening of which the thread has a given pitch;
    b. an annulus having an external thread co-operable with the thread of said opening, and an internal thread having a pitch different from said given pitch; and
    c. a bearing pod having
        i. an external thread cooperable with the internal thread of the annulus, and
        ii. means to provide rotatable support for a shaft adapted to carry said at least one gear.

2. A power train as in claim 1, wherein the difference between the two thread pitches is no greater than unity.

3. A power train having two meshing bevel gears rotatably mounted in a suitable support, wherein the mounting means for at least one gear comprises:
    a. a portion of the support having a threaded opening of which the thread has a given pitch;
    b. a driver having i. a first thread in engagement with the thread of said opening, said first driver thread having said given pitch, and
ii. a second thread having a pitch different from said given pitch; and c. a bearing pod having
i. means to provide rotatable support for a shaft adapted to carry said at least one gear, and
ii. threaded means, of which the thread engages the second driver thread, for shifting the bearing pod longitudinally along the rotational axis of said at least one gear.

4. A power train as in claim 3, wherein the difference between the pitches of the two driver threads is no greater than unity.

5. A power train as in claim 3, wherein said pod has the configuration of a closed loop, and wherein the means to provide rotatable support and said threaded means occupy opposed positions in the closed loop and are coaxial.

6. A power train as in claim 5, and key means for holding the bearing pod against rotation about said axis relative to said support.

7. A power train as in claim 6, wherein the key means are disposed in the closed loop between said support providing means and said threaded means.

8. A power train as in claim 3, and key means for holding the bearing pod against rotation about said axis relative to said support.

9. A power train as in claim 8, the key means being disposed in the pod between said support providing means and said threaded means.

10. A power train as in claim 3, wherein the driver is elongated and its first and second threads are coaxial and spaced apart along the axis.

* * * * *